Figure 4:
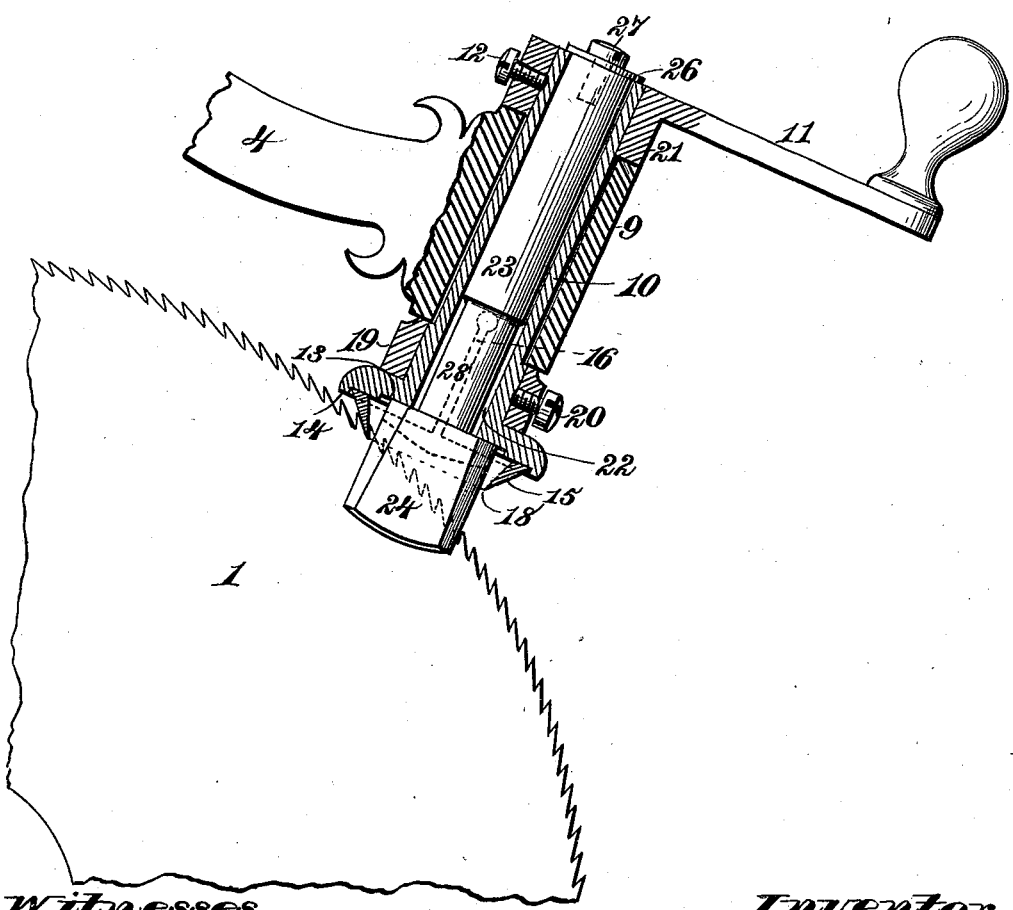

(No Model.) 2 Sheets—Sheet 1.
R. S. MUNGER.
MECHANISM FOR SHARPENING TEETH OF COTTON GIN SAWS.
No. 310,073. Patented Dec. 30, 1884.
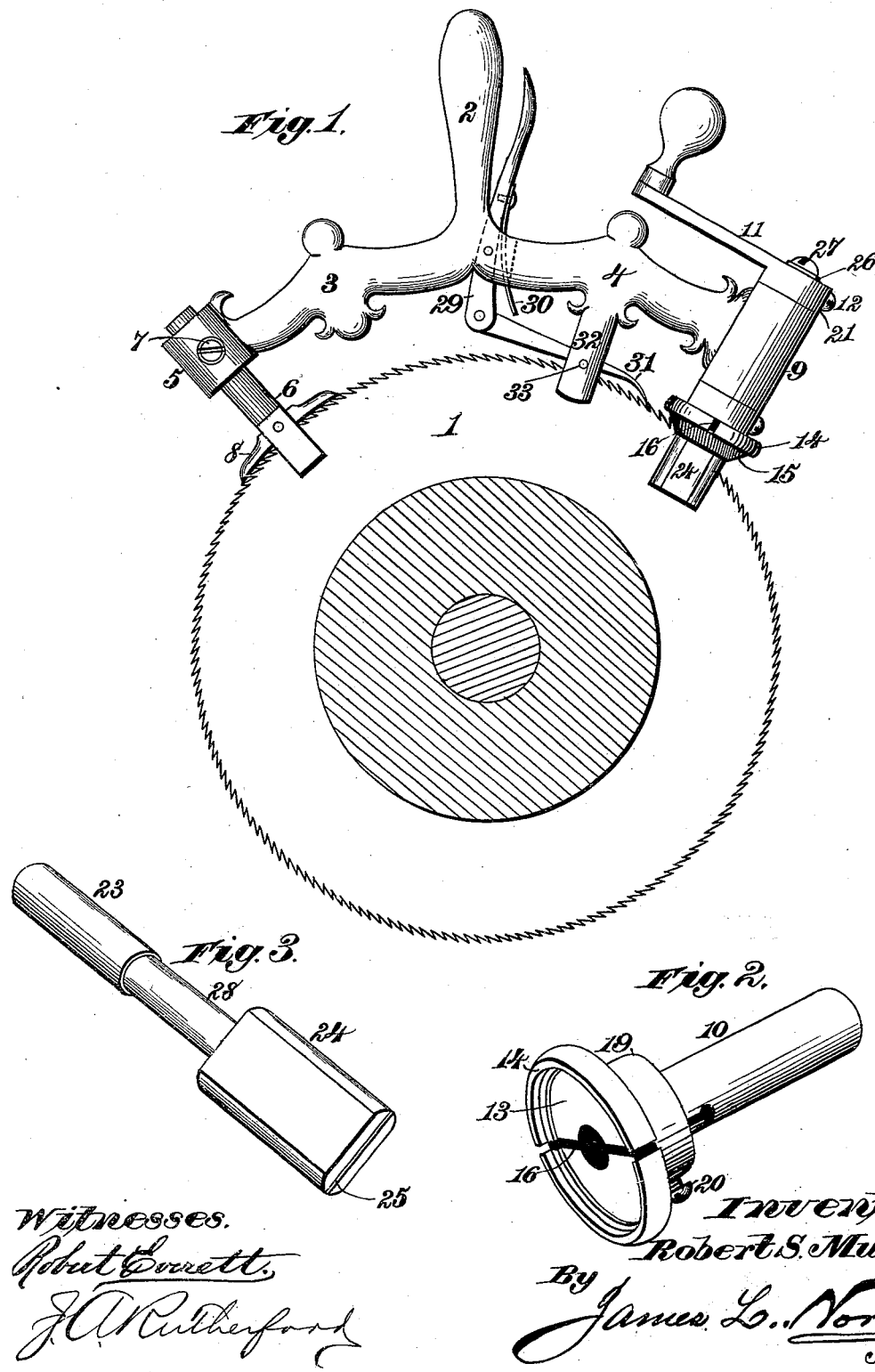

(No Model.) 2 Sheets—Sheet 2.

R. S. MUNGER.
MECHANISM FOR SHARPENING TEETH OF COTTON GIN SAWS.

No. 310,073. Patented Dec. 30, 1884.

UNITED STATES PATENT OFFICE.

ROBERT S. MUNGER, OF MEXIA, TEXAS.

MECHANISM FOR SHARPENING TEETH OF COTTON-GIN SAWS.

SPECIFICATION forming part of Letters Patent No. 310,073, dated December 30, 1884.

Application filed May 31, 1884. (No model.)

*To all whom it may concern:*

Be it known that I, ROBERT S. MUNGER, a citizen of the United States, residing at Mexia, Texas, have invented new and useful Improvements in Mechanism for Sharpening the Teeth of Cotton-Gin Saws, of which the following is a specification.

My invention relates to certain improvements in mechanism for sharpening the teeth of cotton-gin saws, and the purpose thereof is to provide means for holding the annular file of the pattern and construction shown in Fig. 1 of the drawings in Letters Patent No. 265,854, granted to me the 10th day of October, 1882, whereby the file may be readily detachable from its support; also means for guiding the annular rotating file in its action upon the teeth of the saw and accurately centering it or giving it a lateral adjustment relatively thereto; means for adjusting the pitch at which the file or cutter operates upon the teeth of the saw relatively to the diameter of the latter; devices for feeding the saw to the sharpening mechanism, and simple and efficient apparatus for operating said mechanism.

To these ends my invention consists in an arbor having a lower slotted tooth or saw holder adapted to straddle the saw, in combination with a file-holding sleeve rotating upon said arbor, whereby the cutting-tool may be either centered upon the saw or given lateral adjustment relatively thereto, said saw being supported under the action of the file by the holder.

My invention also consists in a file-holder having an inwardly-chamfered ring carried by a suitable stock, both ring and stock being slotted centrally to permit expansion and contraction of the former, a sleeve being mounted upon the stock and provided with a set-screw, whereby the file-holding ring may be contracted to grasp the file or expanded to release it.

My invention also consists in the combination, with the frame supporting the operative parts of an apparatus for sharpening cotton-gin saws, of an adjustable slide-rest having bearing upon the teeth of the saw, and adapted to adjust and preserve the pitch at which the cutting-tool operates upon the teeth of said saw, said adjustment being made relatively to the diameter thereof, and being preserved throughout the whole series of teeth upon the same saw.

My invention also consists in the combination, with the supporting-frame of an apparatus for sharpening cotton-gin saws, of a feed-pawl engaging with the teeth of the saw and pawl engaging with the teeth of the saw and actuated by a spring-lever pivoted upon said frame, whereby the saw is advanced a specified distance at each operation of said lever.

My invention also consists in the several features of construction and combinations of parts hereinafter set forth, and definitely pointed out in the claims.

Referring to the drawings, Figure 1 is a side elevation, showing a gin-saw with the sharpening mechanism placed thereon in position for operation. Fig. 2 is a detail perspective of the file-holding ring and stock detached from the machine. Fig. 3 is a detail perspective of the slotted tooth or saw holder detached. Fig. 4 is a central longitudinal section, taken in the plane of the axis of the file-holder.

In said drawings, the reference-number 1 indicates the gin-saw, which is of the usual form and construction. The sharpening mechanism is formed and used in the manner following:

I construct, by casting or in any other suitable manner, a metallic frame having a handle, 2, and composed, substantially, of two arms or branches, 3 and 4, lying in the same plane and uniting at the point where they join the handle. These arms are deflected downward to a slight degree to cause them to approach at their ends toward the perimeter of the saw.

In the extremity of the arm 3 is formed a socket, 5, which receives the shank of a slide-rest, 6, which is adjustable in said socket in the direction of its length, and held in any required position by a set-screw, 7, which is tapped through the socket and has its end bearing against the shank of the slide-rest. The lower end of the latter is slotted, so that it may straddle the saw, and in the upper portion of the slot is pivoted a curved slide-bar, 8, which rests directly upon the perimeter of the saw.

Upon the extremity of the arm 4 is formed a sleeve, 9, within which the sharpening-tool has support. Within said sleeve, and fitting it with accuracy, is placed a tubular stock, 10, the upper extremity projecting above the bearing 9, and receiving a crank, 11, which surrounds the end of said stock, and is fastened thereon by a set-screw, 12.

Upon the lower end of the stock 10 is formed a disk, 13, provided with an annulus or flange, 14, the inner vertical edge of which is inwardly beveled, to receive the angular edge of the annular file 15. The annulus 14 and disk 13 are divided by a central slot, 16, of suitable width, and this slot is cut up a short distance into the stock. This permits the two halves of the disk and annulus to spring slightly apart to receive the file, and to be drawn together, by means presently to be described, to effect a proper engagement with the file.

The cutting tool or file 15 consists of an annulus having in cross-section the form shown in Fig. 4—that is, being substantially the form of a truncated hollow cone inverted, with the inner and outer faces converging to an edge, 18, such a file being shown in the Letters Patent granted to me, as above stated. This file is cut upon the edge and either or both of said faces, and is sprung into the annulus 14, after which a ring or collar, 19, is slipped upon the tubular stock 10 and pushed until it rests upon the disk 13. This collar carries a set-screw, 20, which is tapped through it, and the collar being turned until said screw stands at an angle of ninety degrees with the central slot, 16, the screw is turned up. As its end bears against one half of the divided stock, and the opposite portion of the collar against the other half, the pressure of said screw will draw the parts of the divided annulus 14 toward each other, causing them to grasp the file securely. The tubular stock 10 being placed in its bearing-sleeve 9 and the crank attached, the collar 19 will lie closely against the lower end of the sleeve, and will, conjointly with the collar 21 of the crank, which rests upon the upper end of the sleeve, prevent all longitudinal play or displacement of the stock and file. The stock 10 is provided with a central opening, 22, passing completely through it from end to end. This opening receives the shank 23 of a tooth-holder, 24. This device, which is shown in detail in Fig. 3, consists of a block of metal formed upon the lower end of the shank 23, said block being provided with a slot or cut, 25, of sufficient width to freely admit the saw. This slot is of such length that when the parts are in place its upper end will rise above the cutting-edge and faces of the file. The upper end of the block 24 is squared off and rests against the lower face of the disk 13, the bearing-surface being a little above the upper edge of the annular file. When in this position, the end of the shank 23 will be flush, or substantially so, with the end of the tubular stock 10. It is fastened by a washer, 26, which lies upon the end of the shank, and is held by a screw, 27, which enters the latter. The lower portion of the shank is cut away or diminished, as shown at 28 in Fig. 3, to permit the contraction of the tubular stock, in the manner already described.

The arm 4 of the machine-frame is slotted at a point near the handle, as shown in broken lines in Fig. 1, and in said slot is pivoted a lever, 29, having its upper end contiguous to the handle 2, and normally thrown by a spring, 30, away from said handle and toward the outer end of the arm 4. To the lower end of this lever is pivoted a feeding-pawl, 31, having its extremity of such form as to engage readily with the teeth of the saw. This pawl receives support upon a drop-bearing, 32, the lower end of which is forked to straddle the pawl, a pin, 33, being passed through the two branches to receive and support the pawl when the machine is removed from the saw. It will readily be seen that by throwing the lever 29 toward the handle 2 the pawl will be pushed in the opposite direction, and by this means a definite and regular feed may be effected, whereby the mechanism may be caused to operate upon each succeeding tooth in its order. If desired, an adjustable gage may be provided, consisting of a set-screw tapped through either the handle or the frame, and engaging with either the upper or the lower portion of the lever. By adjusting this screw the throw of the feed-lever may be increased or diminished to suit the circumstances of each case.

The parts being constructed and assembled in the manner shown and described, the operation of the machine is as follows: The slotted end of the adjustable slide-rest 6 being placed upon the saw, the tooth-holder 24 is turned until its slotted end will also straddle the perimeter of the saw, thereby bringing the cutting-file 15 into the position shown in Figs. 1 and 4. The slide-rest 6 is then adjusted in its socket, either up or down, to bring the cutting-surfaces of the file into such position that they will act upon the teeth of the saw at the proper pitch, such adjustment being controlled, essentially, by the variation in diameter of the different saws in different machines. After being adjusted to the proper point, the set-screw 7 is turned up, and the operator, holding the machine by the handle 2, rotates the file by the crank 11. When the tooth is properly sharpened, which is speedily accomplished, the lever 29 is operated and the entire mechanism is advanced far enough to bring the file into engagement with the succeeding tooth; or by holding the frame the saw may be turned sufficiently to accomplish a similar result. The operation described is thus repeated until the sharpening is completed, cutting all the teeth to precisely the same pitch with great speed and accuracy, and with the expenditure of but little labor. The slotted saw and tooth holder 24 being carried by a shank which has bearing in the tubular stock which carries the cutting-tool, and being accurately centered relatively to said stock, and therefore to the annular file also, it is evident that it will not only support the saw and teeth under the action of the file, but will also effect a true central adjustment with relation to the annular file. It is also evident that by slotting the holder upon one side of the axis of its shank a lateral adjustment of the file upon either side of the saw may be effected when desired.

Having thus described my invention, what I claim is—

1. In an apparatus for sharpening cotton-gin saws, the combination, with an annular cutter, of a ring carrying the same, said ring being mounted upon a suitable stock and both being slit in the line of their common axis, and means for forcing said parts together to grasp the file, substantially as described.

2. In an apparatus for sharpening cotton-gin saws, the combination, with a slitted stock and ring carrying an annular file, of a collar surrounding said stock and carrying a set-screw; whereby the two-part ring may be contracted to hold the file, substantially as described.

3. In an apparatus for sharpening cotton-gin saws, the combination, with the machine-frame having a handle rising therefrom, of a spring-actuated lever pivoted in said frame contiguous to the handle, and a feed-pawl pivoted to said lever and engaging with the teeth of the saw, substantially as described.

4. In an apparatus for sharpening cotton-gin saws, the combination, with a tubular stock carrying an annular file, of a slotted tooth and saw holder, carried by a shank which has bearing in said tubular stock, substantially as described.

5. In an apparatus for sharpening cotton-gin saws, the combination, with a tubular stock carrying an annular file, of a slotted saw-holder carried in said stock, and an adjustable slide-rest, whereby the pitch of the file relatively to the teeth may be adjusted, substantially as described.

6. In an apparatus for sharpening cotton-gin saws, the combination, with a flanged disk carried by a suitable stock, both being slitted in the plane of their common axis, of an annular file engaging with the flange of said disk, and means for springing or forcing the parts toward each other, substantially as described.

In testimony whereof I affix my signature in presence of two witnesses.

ROBERT S. MUNGER.

Witnesses:
JAS. L. NORRIS,
JOS. L. COOMBS.